United States Patent [19]

Smith

[11] Patent Number: 5,365,470
[45] Date of Patent: Nov. 15, 1994

[54] FAST FOURIER TRANSFORM MULTIPLEXED PIPELINE

[75] Inventor: Ronald P. Smith, Redondo Beach, Calif.

[73] Assignee: TRW Inc., Redondo Beach, Calif.

[21] Appl. No.: 15,946

[22] Filed: Feb. 10, 1993

[51] Int. Cl.$^5$ .................................. G06F 15/332
[52] U.S. Cl. ................................................ 364/726
[58] Field of Search ................................... 364/726

[56] References Cited

U.S. PATENT DOCUMENTS

| | | | |
|---|---|---|---|
| 4,534,009 | 8/1985 | McGee | 364/726 |
| 4,604,721 | 8/1986 | Gray | 364/726 |
| 4,868,776 | 9/1989 | Gray et al. | 364/726 |
| 5,034,910 | 7/1991 | Whelchel et al. | 364/726 |
| 5,093,801 | 3/1992 | White | 364/726 |

Primary Examiner—Tan V. Mai

[57] ABSTRACT

A Fast Fourier Transform Multiplexed Pipeline (FFTMP) which includes a row of processing elements each followed by a delay commutator. In one embodiment the FFTMP includes a plurality of inputs, one for each processing element, and FFTs of various sizes are fed to each processing element for simultaneous processing. In another embodiment, Fast Fourier Transforms (FFTs) of various sizes are fed to a common input and each processing element includes an output for outputting each completed FFT. FFTMPs of the present invention can process both decimation in time and decimation in frequency FFTs as well as normal order input or bit reversed input data sets. The simultaneous processing of different size FFTs allows efficient sharing of processing elements and reduces overall hardware requirements.

18 Claims, 3 Drawing Sheets

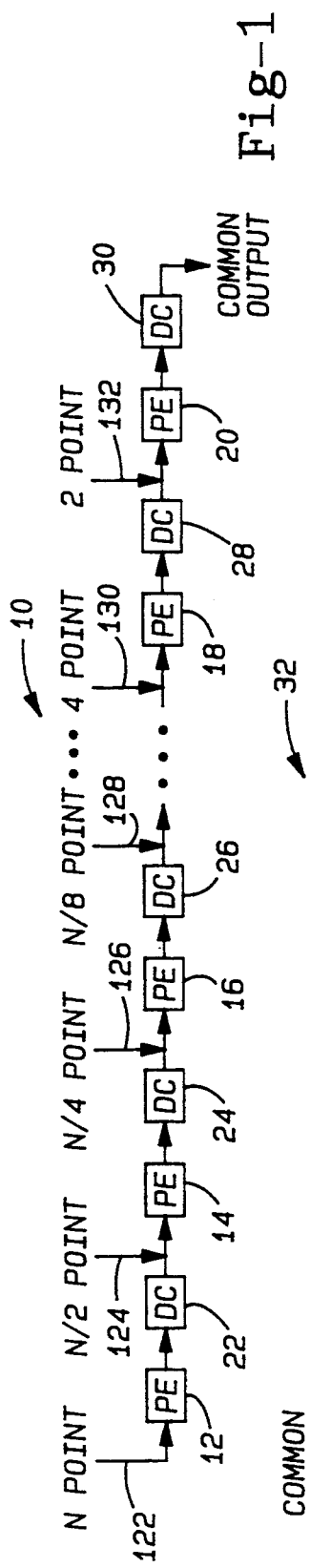
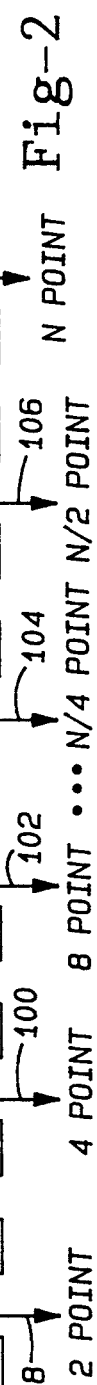
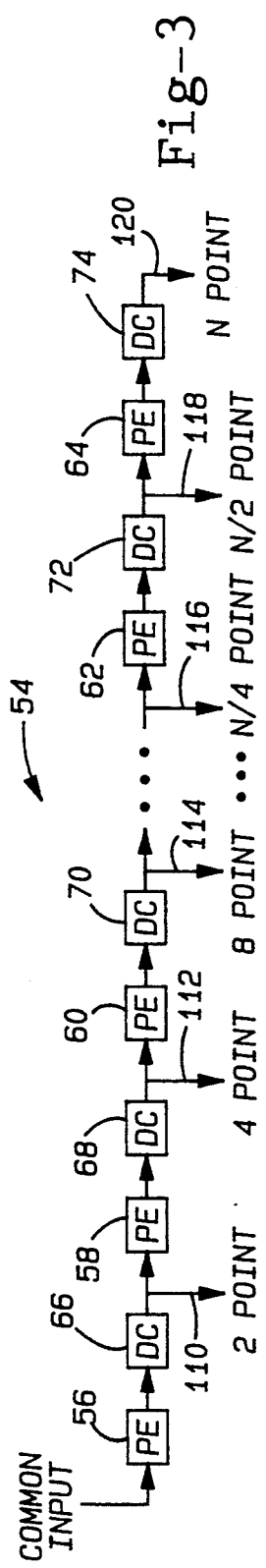
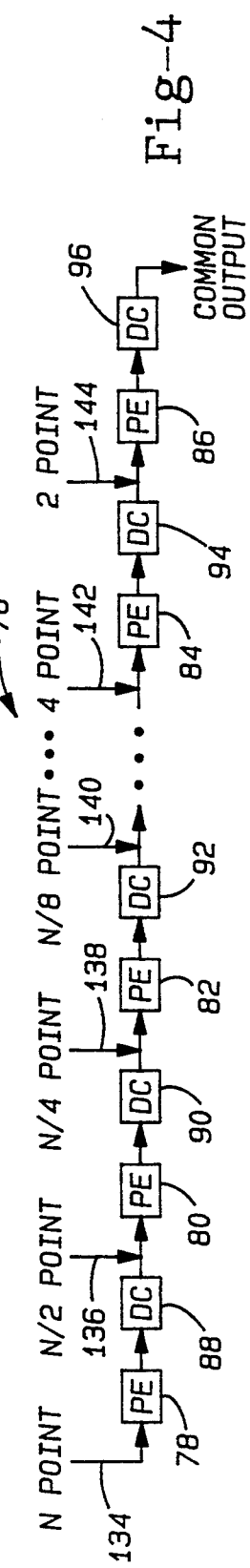

FAST FOURIER TRANSFORM MULTIPLEXED PIPELINE

BACKGROUND OF THE INVENTION

1. Technical Field

The present invention relates to techniques for performing fast fourier transforms and more particularly to a multiplexed pipeline fast fourier transform processor.

2. Discussion

The discrete Fourier transform plays an important role in the analysis, the design, and the implementation of digital signal processing algorithms and systems. One difficulty with discrete Fourier transforms is that they are computationally expensive, since the amount of computation, and thus the computation time, is approximately proportional to $N^2$, where N is the number of terms in the Fourier series. Because of this, a number of techniques have been developed to reduce the time required to compute discrete Fourier transforms. Such techniques generally exploit the special properties of the discrete Fourier transform to group terms and thereby reduce the number of multiplications required.

For example, a group of algorithms known as fast fourier transforms (FFTs) decompose the computation of the discrete fourier transform of a sequence of length N into successively smaller discrete fourier transforms. As a result, the computational time is reduced from $N^2$ to approximately $N \log_2 N$. The two primary ways the fast fourier transform does this is by decimation in time (DIT) and decimation in frequency (DIF). Early FFTs utilized a processing element and a memory where the processing element would first perform the first pass of an N point FFT, and put that in memory. Then the FFT would switch modes and do the second pass on the FFT results which were stored in memory, and so on.

To improve throughput, fast fourier transform pipelines with multiple processing elements were developed. These pipelines utilize a series of processing elements, each performing a single pass of the FFT. The processing elements are cascaded so that they may process multiple passes of an FFT simultaneously and begin processing a subsequent FFT of the same size before completion of the preceding FFT. In a number of applications, the use of multiple size FFTs is required. These applications include MFSK demodulation, spectrum analysis, FIR filtering, and channelizers. Unfortunately, conventional FFT pipelines are generally not useful for different size FFTs since they are configured to perform only an FFT of a particular size. Further, in many applications where small FFTs are required, the large size of such FFT pipelines makes them unattractive. Providing separate processors for each FFT size results in unnecessary duplication of hardware. Further, reconfiguring processors for different size FFTs reduces efficiency by increasing overhead. For example, such overhead includes processors for performing operations such as data routing and processor control. These overhead operations may become a significant portion of the total processing if the data must be flushed from the processor prior to reconfiguration.

An additional problem with FFT pipelines is that there may be a significant amount of idle time while some processing elements are operating and others are not. For example in systems which cannot provide a continuous stream of data to the FFT processor, when beginning a new FFT after waiting for data, some processing elements sit idle while preceding processing elements are performing their FFTs. Likewise, when finishing an FFT prior to new data becoming available, some processing elements sit idle while subsequent processing elements perform their FFTs.

Thus, it would be desirable to provide an FFT pipeline which makes more efficient utilization of its processing elements to reduce the idle time of individual processing elements. Further, it would be desirable to provide a way to permit an FFT pipeline processor of a given size to be utilized for different size FFT computations without requiring reconfiguration or duplication of processing elements. Further, it would be desirable to reduce the overall hardware requirements for FFT pipelines.

SUMMARY OF THE INVENTION

Pursuant to the present invention, a fast fourier transform multiplexed pipeline processor and method is provided. The fast fourier transform multiplexed pipeline takes advantage of the repetitive structure of the common FFT algorithms, either decimation in frequency or decimation in time, to efficiently process different sized FFTs simultaneously.

In accordance with a first embodiment of the present invention the FFT multiplexed pipeline of the present invention is adapted to process normal order input data and produce bit reversed order output. The pipeline processor includes an input means for receiving a plurality of data sets. A row of processing elements each receives data either directly from the input means or from a preceding processing element in the row. Each processing element is adapted to perform one pass of a DIF FFT, wherein the processing elements are arranged in the row so that the first processing element is adapted to perform the first pass of an N point DIF FFT, N being the largest point FFT said processor can perform. Each succeeding processing element is adapted to perform the first pass of a DIF FFT which has half the number of points than the one preceding it. Each processing element continuously repeats its set of operations. A memory is connected to the output of each successive processing element in the row for storing the output of each processing element and for transferring it to the next successive processing element in the row. In this way, successive processing elements following the first processing element each perform smaller FFTs at the same time that preceding processing elements are performing larger point FFTs.

In another embodiment of the present invention, an FFT multiplexed pipeline is adapted to perform a plurality of FFTs presented in bit reversed order and produce a normal order output. The pipeline includes an input means for receiving a plurality of data sets. A row of processing elements includes a first processing element which receives data from the input means and successive processing elements in the row receives data from only the preceding processing element. Each processing element is adapted to perform one pass of a DIT FFT, the processing elements are arranged in the row so that the last processing element is adapted to perform the last pass of an N point DIT FFT, where N is the largest point FFT to be processed by the multiplexed pipeline. Each preceding processing element is adapted to perform the last pass of a DIT FFT having half the number of points as the one succeeding it. Each processing element continuously repeats its set of operations.

The multiplexed pipeline also includes a plurality of output means for receiving completed FFT results from each processing element. A memory means is connected to the output of each processing element and also to one of the output means for storing the output of each processing element. The memory means transfers this output to the next successive processing element in the row if the FFT was not completed by the preceding processing element, or to one of the output means if the FFT was completed by the preceding processing element. In this way, processing elements preceding any given processing element can perform smaller FFTs at the same time said given processing element is performing its FFT.

Two other embodiments of the present invention are similar to the two previously described embodiments. The differences are as follows. In the embodiment with normal order input data, the DIF processing elements are replaced with DIT processing elements. In the embodiment with bit reverse order input data, the DIT processing elements are replaced with DIF processing elements. Each element is adapted to perform one pass of an N point FFT, N being the largest point FFT said processor can perform. The first processing element performs the first pass of the FFT, the second processing element performs the second pass, and so on. In these two embodiments, one control signal is required. This signal must cause each processing element to restart the pass of the FFT that it is adapted for when the first data of a block enters that processing element. Thus, if the current data block is, say, N/2 points, the succeeding data block will enter each processing element when that element is half way through the processing of its N point pass. Instead of continuing the pass, the processing element must restart at the beginning of the pass for the new block of data. The control signal may not require any overhead to generate because conventional pipeline FFTs may use a signal which marks the beginning of each block of data.

BRIEF DESCRIPTION OF THE DRAWINGS

The various advantages of the present invention will become apparent to one skilled in the art by reading the following specialization and by reference to the following drawings in which:

FIG. 1 is a diagram of an FFT multiplexed pipeline in accordance with the present invention adapted to be utilized with normal order input data processed by means of decimation in frequency FFTs to produce bit reversed order output;

FIG. 2 is a diagram of an FFT multiplexed pipeline in accordance with invention adapted to receive bit reversed order input processed by means of decimation in time FFTs to provide normal order output;

FIG. 3 is a diagram of an FFT multiplexed pipeline in accordance with the present invention adapted to receive bit reversed order input and process it with decimation in frequency FFTs to produce normal order outputs;

FIG. 4 is a diagram of an FFT multiplexed pipeline in accordance with the present invention adapted to process normal order input data with decimation in time FFTs to produce bit reversed order outputs.

DESCRIPTION OF THE PREFERRED EMBODIMENTS

Figure 5:
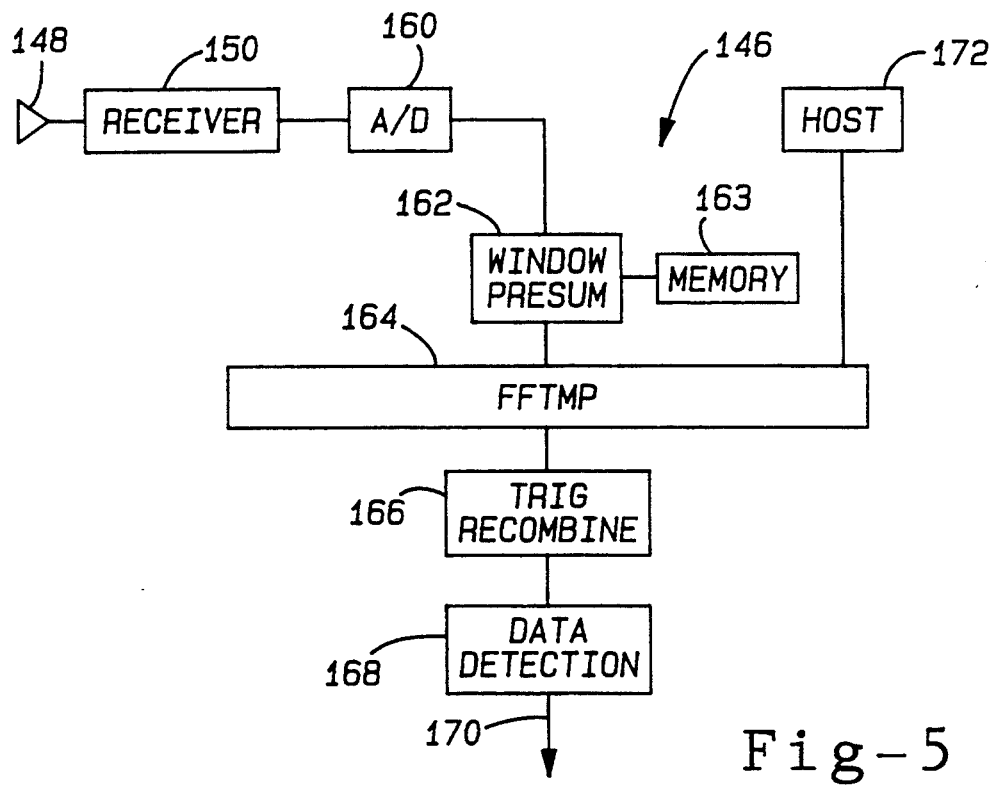
FIG. 5 is a diagram of an MFSK demodulation communication system utilizing the FFT multiplexed pipeline of the present invention.

The present invention is a fast fourier transform multiplexed pipeline which uses repetitive characteristics of common FFT algorithms to perform multiple FFTs of different sizes simultaneously in a single pipeline processor. The fast fourier transform multiplexed pipeline (FFTMP) processor of the present invention takes advantage of the repetitive structure of two common FFT algorithms for power of two FFT sizes. These algorithms are the decimation in frequency (DIF) and decimation in time (DIT) algorithms. It will be appreciated by those skilled in the art that the DIF and DIT algorithms can both be implemented using cascaded processing elements separated by delay commutator memory elements. For further background on DIF and DIT FFT algorithms, see A. Oppenheim, and R. Schafer, *Digital Signal Processing*, Chap. 6, "Computation of the Discrete Fourier Transform", p. 284-307, which is hereby incorporated by reference.

Typically, one processing element is used per stage in an FFT pipeline, there being $\log_2 N$ stages in an N point FFT pipeline. Each processing element repetitively performs a sequence of operations. The FFTMP of the present invention uses this inherent repetition to efficiently process different size FFTs simultaneously. Referring now to FIG. 1, an FFTMP 10 is shown for the case of a DIF FFT. The FFTMP 10 is an N point FFT with $\log_2 N$ processing elements 12-20. Each processing element has an associated delay commutator 22-30. Of course, additional processing elements and delay commutators may exist (depending on the size of N) in the space designated with ". . . ". By structuring the FFT for normal order input and bit reversed order output, the first processing element 12 performs the first pass of an N point FFT, the second processing element 14 performs the second pass of an N point FFT, and so on.

It is notable that the second pass is performed (by processing element 14) by a sequence of operations repeated twice and this sequence is identical to the first pass of an N/2 point FFT. Similarly, the third pass (performed by the third processing element 16) repeats a sequence four times, and this sequence is identical to the first pass of an N/4 point FFT. Also, this sequence, by repeating twice, is identical to the second pass of an N/2 point FFT. This pattern exists for all processing elements of the pipeline 10.

Referring now to FIG. 2, a DIT FFT pipeline 32 is shown. Pipeline 32 includes processing elements 34-42 and delay commutators 34-52. In this DIT FFT pipeline, a similar pattern exists for a bit reversed order input, normal order output structure, except in reverse. In particular, the last pass of an N point FFT is unique, and is performed by processing element 34. The second to last pass (performed by processing element 36) repeats a sequence twice, and this sequence is identical to the last pass of an N/2 point FFT. The third to last pass repeats a sequence four times and this sequence is identical to the last pass of an N/4 point FFT, or by repeating twice, is identical to the second to last pass of an N/2 point FFT. This pattern exists for all processing elements of the pipeline 32. In brief, the FFTMP of the present invention uses the above described repetition to simultaneously perform multiple FFTs of different sizes in a single pipeline processor.

As illustrated in FIGS. 3 and 4, the FFTMP structure can be implemented by replacing DIF processing elements with DIT processing elements or, conversely, replacing DIT processing elements with DIF processing elements. In the former case, this substitution will yield a DIT structure (as shown in FIG. 4) with normal order input and bit reversed order output. In the latter case, the substitution will yield a DIF structure (as shown in FIG. 3) with bit reversed order input and normal order output. In more detail, FIG. 3 shows an FFTMP 54 comprising processing elements 56–64 and delay commutators 66–74 for performing a DIF FFT with bit reversed order input and normal order output. FIG. 4 shows FFTMP 76 comprising processing elements 78–86 and delay commutators 88–96 for performing a DIT FFT with normal order input and bit reversed output.

In these cases (FFTMP 54 and FFTMP 76), different repetitive structures in the FFT algorithm are taken advantage of than those described above for FFTMP 10 and FFTMP 32. For a bit reversed order input DIF FFT, FFTMP 54, the first half of the first pass of an N point FFT is identical to the entire first pass of an N/2 point FFT. Similarly, the first 1/L section of pass n of an N point FFT is identical to the entire pass n of an N/L point FFT. Here N and L are powers of two and N is greater than or equal to L. Also, n is less than or equal to $\log_2(N/L)$ and indicates the number of processing elements counting from the start of the pipeline. For a normal order input DIT FFT, FFTMP 76, the first half of the last pass of a N point FFT is identical to the entire last pass of an N/2 point FFT. Similarly, the first 1/L section of pass m of an N point FFT is identical to the entire pass $[\log_2(N/L)-(\log_2-m)]$ of an N/L point FFT. Here m is such that $(\log_2N-m)$ is less than or equal to $\log_2(N/L)$, and $(\log_2N-m)$ indicates the number of processing elements counting backwards from the end of the pipeline.

In both of these cases, FFTMP 54 and FFTMP 76, each processing element is adapted to perform one pass of an N point FFT, N being the largest point FFT said processor can perform. The first processing element, 56 or 78, performs the first pass of the FFT, the second processing element, 58 or 80, performs the second pass, and so on. To perform an FFT smaller than N points, each processor performs only the first section of an N point pass. For example, for an L point FFT, with L a power of two and L less than N, each processing element will perform only the first L points of an N point pass. To accomplish this, the twiddle factor (coefficient) sequence of any processing element must be restarted at the beginning of each succeeding block of data, without affecting the processing of the preceding block of data. No other operation of the processing element needs to be affected other than the sequencing of the twiddle factors and no processing element overhead need be incurred.

It will be appreciated by those skilled in the art that the FFT process performed by the processing elements involves multiplications by cosines and sines of certain angles. These values, which are referred to as the twiddle factors above, are stored in memory. In FIGS. 1 and 2, each processing element is adapted to repeat a set of operations repeatedly to produce an N point FFT, for smaller FFTs the same operations are performed fewer times. However, for FIGS. 3 and 4, each processing element is adapted to perform a set of N operations which produce an N point FFT, for smaller FFTs only the first portion of these operations are desired. The difference between the first and subsequent portions of the N point FFT consists only of using a different set of twiddle factors. Thus, in order to perform smaller FFTs, only the twiddle factor sequencing need be reset, so that the processing element reuses the same set of twiddle factors. This reset may be implemented by using a signal, which is inherent in many conventional pipeline FFT implementations, which marks the beginning of each block of data. If the particular hardware processing element being used does not allow twiddle factor reset without interrupting other operations which would corrupt the preceding data block, a small "flush" overhead may be incurred to allow the last word of the preceding data block to exit the processing element before the first word of the next data block enters that processing element.

For the normal order DIF FFTMP 10 or DIT FFTMP 76, data for the various size FFTs is input at different processing elements depending on the size, and all the data is output from the pipeline at the last processing element output. For bit reversed order input DIF FFTMP 54 or DIT FFTMPs 32, all data is input at the first processing element, and data for the various size FFTs is output from different processing element outputs depending on the size. In particular, these outputs comprise outputs 98–108 in FIG. 2 and outputs 110–120 in FIG. 3, and these inputs comprise inputs 122–132 in FIG. 1 and inputs 134–144 in FIG. 4. In this way, data for various size FFTs may be present in the pipeline simultaneously without the need to flush data between FFTs.

Referring now to FIG. 5, a diagram of a MFSK demodulation system in accordance with the present invention is shown. For example, this system may be used as a communication receiver in a satellite. It will be appreciated that in MFSK demodulation there are certain frequency locations where a signal might be and it is desired to look at those locations for the signal. The system 146 includes an antenna 148 which receives the radio signal. An analog receiver 150 connected to the antenna 148 processes the received signal and transmits it to an Analog to Digital converter 160 which transmits a digitized signal to a window presum 162. The window presum 162 reduces the frequency range to specific bands for sampling. This signal is then fed to the fast fourier transform multiplexed pipeline 164 in accordance with the invention which transmits an output to a trigonometric recombine 166 that outputs to a data detector 168. The output on line 170 will be a measure of how much energy is in each of the frequency slots analyzed by the FFTMP 164. A host computer 172 is connected to the MFSK demodulator to control such tasks as initialization, timing, function and data flow control.

Figure 6:
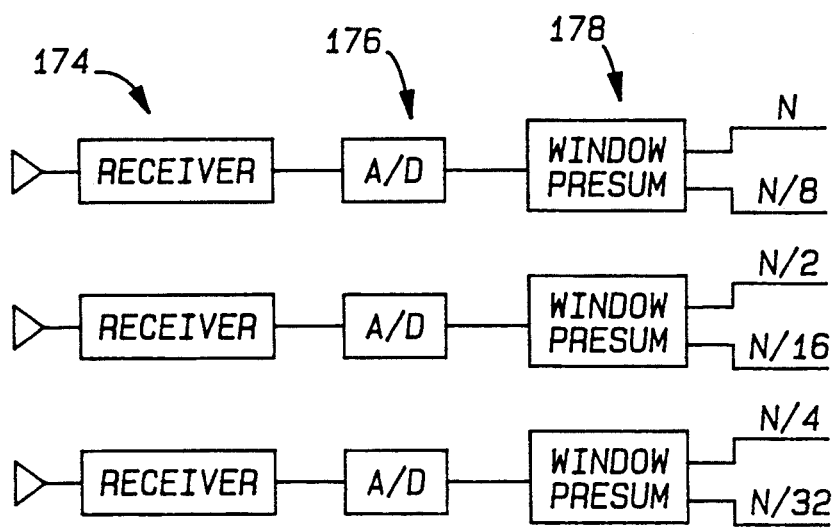
FIG. 6 is a diagram of the front end of an MFSK demodulation system requiring FFTs of different sizes.

While the diagram in FIG. 5 only shows a single input into the FFTMP 164, in accordance with the present invention several inputs may be processed simultaneously. For example, as shown in FIG. 6, three separate antennas may be fed into analog receivers 174, Analog to Digital convertors 176, and window presums 178 which breaks the output into two different data sets. For example, the signal from the first antenna is broken into N and n/8 data sets; from the second antenna is N/2 and N/16 data sets and from the third antenna, into N/4 and N/32 data sets. In this way, six separate data sets are produced and in accordance with the present invention these data sets under control of the host 172 may be fed to a single FFTMP 164 for simultaneous processing.

Figure 7A:
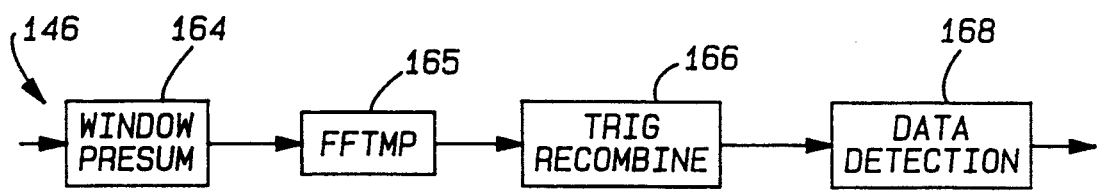
FIG. 7A-7D are diagrams of the FFT multiplexed pipeline in accordance with the present invention utilized in various applications.
Figure 7B:
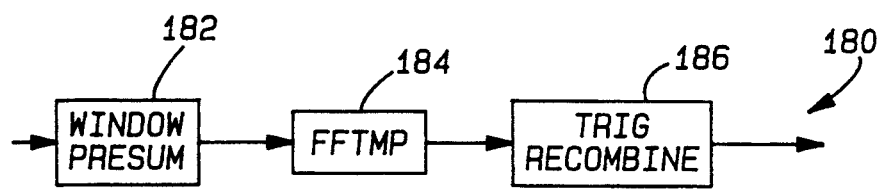
Figure 7C:
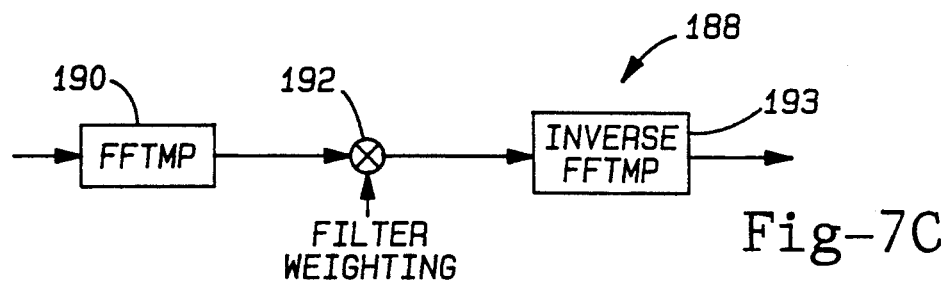
Figure 7D:
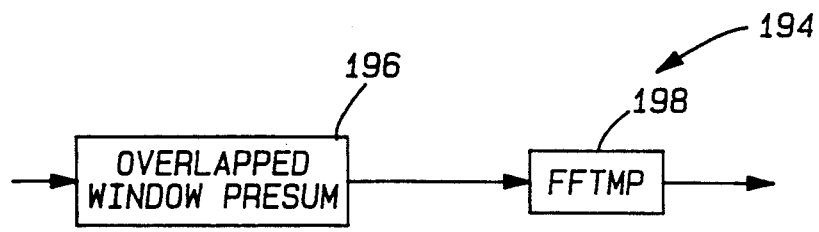

Referring now to FIGS. 7A–7D, diagrams of a number of various applications of the fast fourier transform multiplexed pipeline in accordance with the present invention is shown. Digital data originating from an Analog to Digital convertor, a host computer, preceding processors or memory, may be fed into an MFSK demodulator, a spectrum analyzer, a finite impulse response (FIR) filter, or a channelizer (equivalent to a bank of FIR filters). The MFSK demodulator system 146 in FIG. 7A is essentially the same as one shown in FIG. 5. The spectrum analyzer 180 in FIG. 7B includes a window presum 182, an FFTMP 184 and trigonometric recombine 186. The FIR filter 188 in FIG. 7C includes the FFTMP 190, a filter weighting unit 192 and an inverse FFT unit 192. A channelizer system 194 in FIG. 7D includes an overlapped window presum 196 to preprocess data and the FFTMP unit 198 to complete the implementation of a bank of filters.

The operation of the FFTMP 10 shown in FIG. 1 will now be illustrated with a specific example where N = 1024. A 1024 point data set is first transmitted to the first processing element 12 through the input labeled 122. This first processing element performs the first pass of the 1024 point FFT, that is, it processes the first one of ($\log_2 N$) = 10 stages of a 1024 point FFT. As the data is processed it is output to the first memory 22. The memory functions as a delay commutator, delaying the data until half of the pass is processed, then outputting in a different order to the next processing element. No data is output from memory 22 during the first half of the pass. During this time, which equals 512 clock cycles, the subsequent processing elements 14–20 would ordinarily sit idle. However, in accordance with the present invention a 512 point FFT data set is transmitted into the second processing element 14 through the input 124 at approximately the same time as the 1024 point data set enters the first processing element 12. Likewise, a 256 point FFT may simultaneously enter the third processing element 16 through input 126, a 128 point FFT simultaneously enters a fourth processing element (not shown), a 64 point FFT enters a fifth processing element (not shown), a 32 point FFT enters a sixth processing element (not shown), a 16 point FFT enters a seventh processing element (not shown), an 8 point FFT enters the eighth processing element (not shown), a 4 point FFT enters the ninth processing element 18 through input 130, and a 2 point FFT enters the tenth processing element 20 through input 132.

The timing and control of the input of the various FFT data sets will be controlled by the host computer 172. Alternatively, an application specific integrated circuit may perform this function.

To demonstrate the improvement in computational throughput achieved by the present invention, consider an N point FFT pipeline. In the time a conventional FFT pipeline would take to perform two N point FFTs, the FFTMP of the present invention can compute the following:

A. One FFT of each size from N, (N/2), (N/4), (N/8), . . . , 8, 4 and two 2 point FFTs, or B. One FFT of each size from N, (N/2), (N/4), (N/8), . . . , (2L) and two L point FFTs where L is a power of two, or C. One N point, three (N/4) point, one (N/8) point, three (N/32) point, and two (N/64) point FFTs, or D. Any of various similar combinations of FFT sizes.

It should be noted that the FFTMP 10 of the present invention accomplishes the above by data routing alone, without modifying any processor element control signal and can maintain the selected FFT combination indefinitely, or switch to another combination as often as every (2N) cycles. Thus, there was no processor element overhead incurred.

From the foregoing, it can be seen that the present invention provides a fast fourier transform multiplexed pipeline system and method which makes more efficient use of hardware. It reduces idle time by performing FFTs of different sizes simultaneously. Also, the system can perform different size FFTs without being reconfigured. Those skilled in the art can appreciate that other advantages can be obtained from the use of this invention and that modification may be made without departing from the true spirit of the invention after studying the specification, drawings and following claims.

What is claimed is:

1. A fast fourier transform (FFT) processor for processing normal order input data and producing bit reversed order output, said processor comprising:

input means for receiving a plurality of normal order input data sets;

a row of processing elements each receiving data either from said input means or from a preceding processing element, each processing element adapted to perform one pass of a DIF FFT, wherein said processing elements are arranged in said row such that the first processing element is adapted to perform the first pass of an N point DIF FFT, N being equal to $2^n$ where n is an integer and being the largest point FFT said FFT processor performs, and each succeeding processing element is adapted to perform the first pass of a DIF FFT which has half the number of points than the preceding processing element; and memory means connected to the output of each successive processing element in said row for storing and transferring the results of each processing element to the next successive processing element in said row, whereby said successive processing elements following said first processing element in said row perform said smaller FFTs on said data sets at the same time that said first processing element and any preceding processing elements are performing larger point FFTs.

2. The FFT processor of claim 1 further comprising:

controller means for directing selected ones of said data sets from said input means to a processing element in said row during a time when said processing element is otherwise unused and a preceding processing element is in use.

3. The FFT processor of claim 1 wherein the last processing element is adapted to perform a two point FFT.

4. The FFT processor of claim 1 wherein the last memory means in said row outputs serially the results from all the FFTs performed on said input data sets.

5. The FFT processor of claim 1 wherein said input means includes a preprocessor means.

6. A fast fourier transform (FFT) processor for processing bit reversed order input and producing normal order output, said processor comprising:

input means for receiving a plurality of bit reversed order input data sets;

a row of processing elements, the first processing element receiving data from said input means and each successive processing element receiving data from the preceding processing element;

each processing element adapted to perform one pass of a DIT FFT, said processing elements arranged in said row such that the last processing element is adapted to perform the last pass of an N point DIT FFT, where N is equal to $2^n$, where n is an integer, and where N is the largest point FFT to be processed by said FFT processor, and each preceding processing element is adapted to perform the last pass of a DIT FFT having half the points as the succeeding processing element;

a plurality of output means each connected to one processing element for receiving completed FFT results therefrom;

memory means connected to the output of each processing element and also to one of said output means for storing and transferring the output of each processing element to either the next successive processing element in the row, if the FFT was not completed by the preceding processing element, or to one of said output means if the FFT was completed by the preceding processing element, wherein processing elements preceding a given processing element perform smaller FFTs at the same time said given processing element is performing a FFT.

7. The FFT processor of claim 6 further comprising controller means for directing said data sets in a predetermined order to said input means and for receiving output data from said output means.

8. The FFT processor of claim 6 wherein the last processing element performs one pass of an N point FFT.

9. The FFT processor of claim 6 wherein said input means includes a preprocessor.

10. A fast fourier transform (FFT) processor for processing normal order input data and producing bit reversed order output, said processor comprising:

input means for receiving a plurality of normal order input data sets;

a row of processing elements each receiving data either from said input means or from a preceding processing element, each processing element adapted to perform one pass of an N point DIT FFT, N being equal to $2^n$ where n is an integer and being the largest point FFT said FFT processor can performs, wherein said processing elements are arranged in said row such that the first processing element is adapted to perform the first pass of the N point DIT FFT, the second and each succeeding processing elements are adapted to perform the second and subsequent passes respectively of said N point DIT FFT, and each succeeding processing element is adapted to perform the first pass of a DIT FFT which has half the number of points than the preceding processing element;

memory means connected to the output of each successive processing element in said row for storing and transferring the results of each processing element to the next successive processing element in said row, whereby said successive processing elements following said first processing element in said row perform said subsequent passes of an FFT on said data sets at the same time that said first processing element and any preceding processing elements are performing preceding passes of an FFT; and control means for causing each processing element to restart the pass of the FFT that the processing element is adapted to perform.

11. The FFT processor of claim 10 further comprising:

second controller means for directing selected one of said data sets from said input means to a processing element in said row during a time when said processing element is otherwise unused and a preceding processing element is in use.

12. The processing element of claim 10 wherein said controller means further comprises twiddle factor sequence reset means.

13. The FFT processor of claim 10 wherein the last memory means in said row outputs serially the results from all the FFTs performed on said input data sets.

14. The FFT processor of claim 10 wherein said input means includes a preprocessor means.

15. A fast fourier transform (FFT) processor for processing bit reversed order input and producing normal order output, said processor comprising:

input means for receiving a plurality of bit reversed order input data sets;

a row of processing elements, the first processing element receiving data from said input means and each successive processing element receiving data from the preceding processing element;

each processing element adapted to perform one pass of an N point DIF FFT, where N is equal to $2^n$ where n is an integer and where N is the largest point FFT to be processed by said FFT processor, said processing elements arranged in said row such that the first processing element is adapted to perform the first pass of the N point DIF FFT, the second and each succeeding processing element is adapted to perform the second and subsequent passes respectively of said N point DIF FFT;

a plurality of output means each connected to one processing element for receiving completed FFT results therefrom;

memory means connected to the output of each processing element and also to one of said output means for storing and transferring the output of each processing element to either the next successive processing element in the row, if the FFT was not completed by the preceding processing element, or to one of said output means if the FFT was completed by the preceding processing element, wherein processing elements preceding a given processing element perform smaller FFTs at the same time said given processing element is performing a FFT; and control means for causing each processing element to restart the pass of the FFT that the processing element is adapted to perform.

16. The FFT processor of claim 15 further comprising second controller means for directing said data sets in a predetermined order to said input means and for receiving output data from said output means.

17. The FFT processor of claim 15 wherein said controller means further comprises twiddle factor sequence reset means.

18. The FFT processor of claim 15 wherein said input means includes a preprocessor.

* * * * *

UNITED STATES PATENT AND TRADEMARK OFFICE
CERTIFICATE OF CORRECTION

PATENT NO. : 5,365,470
DATED : November 15, 1994
INVENTOR(S) : Ronald P. Smith

It is certified that error appears in the above-indentified patent and that said Letters Patent is hereby corrected as shown below:

Column 4, line 55, change 34 to 44.

Column 7, line 18, change 192 to 193.

Signed and Sealed this

Thirty-first Day of January, 1995

Attest:

BRUCE LEHMAN

Attesting Officer

Commissioner of Patents and Trademarks